United States Patent [19]

Genzer et al.

[11] 3,725,413

[45] Apr. 3, 1973

[54] PROCESS FOR THE PRODUCTION OF ETHYL 8-HYDROXY-1,3-DIOXOLO[4,5G]-QUINOLINE-7-CARBOXYLATE

[75] Inventors: Jerome Genzer, Livingston; George Conrad, Irvington, both of N.J.

[73] Assignee: Warner-Lambert Company, Morris Plains, N.J.

[22] Filed: Jan. 17, 1972

[21] Appl. No.: 218,504

Related U.S. Application Data

[63] Continuation-in-part of Ser. No. 164,451, July 20, 1971, abandoned.

[52] U.S. Cl. .........................260/287 R, 260/283 SY
[51] Int. Cl. ..............................................L07d 33/48
[58] Field of Search.......................................260/287

[56] References Cited

UNITED STATES PATENTS

| 2,491,801 | 1/1950 | Fisher | 260/287 |
| 3,397,208 | 8/1968 | Berman | 260/287 |

FOREIGN PATENTS OR APPLICATIONS

| 1,814,187 | 7/1969 | Germany | 260/287 |
| 1,936,393 | 2/1970 | Germany | 260/287 |

OTHER PUBLICATIONS

Medard, Jour. Indian Chem. Soc. Vol. 31, p. 951, (1954).

*Primary Examiner*—Donald G. Daus
*Attorney*—Albert H. Graddis et al.

[57] ABSTRACT

A process for the production of ethyl 8-hydroxy-1,3-dioxolo[4,5g]-quinoline-7-carboxylate is disclosed. This process comprises reacting ethyl alcohol with phosphorous pentoxide under carefully controlled temperature conditions using xylene as the vehicle. To this reaction mixture is added diethyl (3,4-methylenedioxyphenyl)-aminomethylenemalonate which is then heated at 138° to 140° C. for about 60 minutes to produce the desired product. Ethyl 8-hydroxy 1,3-dioxolo[4,5g]-quinoline-7-carboxylate is useful as an intermediate for the production of oxolinic acid.

4 Claims, No Drawings

PROCESS FOR THE PRODUCTION OF ETHYL 8-HYDROXY-1,3-DIOXOLO[4,5G]-QUINOLINE-7-CARBOXYLATE

This application is a continuation-in-part application of our copending application, U. S. Ser. No. 164,451, filed July 20, 1971, now abandoned.

The present invention relates to a novel process and relates more particularly to a new and improved process for the production of ethyl 8-hydroxy-1,3-dioxolo[4,5g]-quinoline-7-carboxylate on a commercial scale. This product has the following structural formula:

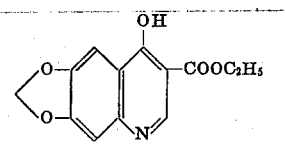

It is an important chemical intermediate. Thus, for example, it can be alkylated and hydrolyzed to produce N-alkylated derivatives such as the N-ethyl derivative of the formula:

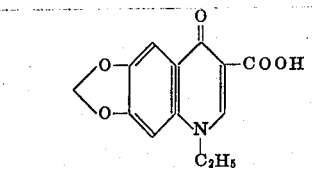

by processes disclosed, for example, in U. S. Pat. No. 3,287,458. The N-ethyl derivative known generically as oxolinic acid is an important therapeutic agent in the treatment of urinary tract infections caused, for example, by E. Coli.

It has now been found that this important chemical intermediate lends itself to production on a large scale by the practice of this invention.

According to the present invention, ethyl alcohol is allowed to react with phosphorus pentoxide under carefully controlled temperature conditions using xylene as the vehicle. Generally speaking, the temperature is held below 120° C. The diethyl(3,4-methylenedioxyphenyl)-aminomethylenemalonate is added all at once and the mixture is heated to and held at 138° to 140° C. for approximately 60 minutes. After cooling, the reaction mixture is poured into a base, for example, ammonia-ice mixture, or aqueous alkali metal hydroxide-ice mixture. The resultant precipitate containing the desired product is recovered by conventional procedures.

The foregoing reaction is illustrated in the following reaction scheme:

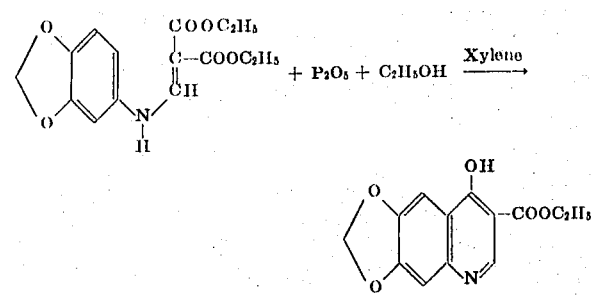

The product obtained without further purification is N-ethylated and hydrolyzed, for example, to give oxolinic acid.

In the ethyl alcohol-phosphorous pentoxide reaction, the ratio of these reactants is not critical and they are employed at a molar ratio of about 3.53 to 2.6. These materials need not be pure and any of the commercially available products can be employed in the reaction. In this reaction it is desirable to hold the temperature below 120° C. typically at a range of about 100° to 120° C. This is accomplished by adding the alcohol at such a rate that the desired temperature is maintained.

The diethyl(3,4-methylenedioxyphenyl)-aminomethylene malonate is prepared according to the disclosure in the aforesaid U.S. patent and it is employed at a molar ratio of 1 with respect to the above alcohol-phosphorus pentoxide reaction mixture.

The process of this invention offers many unexpected advantages over previously known processes. The most significant advantages are that the use of high temperature to effect the ring closure reaction is entirely eliminated and the yield is significantly increased. Consequently, the use of expensive equipment, as well as very high temperature, is no longer necessary. These improvements result in a material reduction in the cost of the manufacture of this product.

In order to further illustrate the practice of this invention, the following examples are given:

EXAMPLE 1

Into a 5 liter flask containing 640 ml. of xylene is added 369 grams of powdered phosphorus pentoxide, with stirring while maintaining the temperature at 25° C. Into this is added 216 ml. of anhydrous Solox (proprietary solvent obtainable from U. S. Industrial Chemicals Company) at such a rate so as to maintain the temperature of the mixture at about 100° – 120° C. When all the Solox has been added, the temperature is allowed to drop to about 70° C. and 307.3 grams of diethyl(3,4-methylenedioxyphenyl)-aminomethylenemalonate is introduced into the reaction mixture. THereafter, the mixture is heated as rapidly as possible to a temperature of about 138° C. and maintained at 138° ± 2° for 2 hours. The reaction mixture is poured directly onto a cold stirred mixture composed of 2 kg. of ice and 200 ml. of a 50 percent aqueous solution of sodium hydroxide.

Any residual mixture in the flask is washed out with dimethylformamide and this wash combined with the main aqueous mixture. The resultant aqueous mixture is adjusted to a pH of about 6.8. The reaction mixture is centrifuged, washed well with water and then Solox and dried to obtain 249 grams (95.3 percent yield of ethyl 8-hydroxy-1,3-dioxolo[4,5g]quinoline-7-carboxylate).

EXAMPLE 2

Into a reaction vessel is charged 64 ml xylene, 36.9 grams powdered phosphorus pentoxide with stirring. Into this is added 21.6 ml of anhydrous Solox (proprietary solvent obtained from U.S. Industrial Chemicals Company), which is a mixture of lower molecular weight alcohol, at such a rate so as to maintain the temperature of the mixture at 100°–120° C. When all the Solox has been added, the temperature is allowed to drop to about 70°–75° C. and 30.7 grams of diethyl (3,4-methylenedioxyphenyl)- aminomethylenemalonate is introduced into the reaction mixture. Thereafter, the mixture is heated as rapidly as possible to a temperature of about 138° C. and maintained at 138° C. ± 2° C. for one hour. The reaction mixture is poured directly on to a cold stirred mixture comprising 100 grams of ice and 50 ml of concentrated ammonium hydroxide. The temperature of this mixture is maintained at less than 40° C. by the addition of ice. The pH of this mixture is about 9.5.

Any residual mixture in the reaction vessel is washed out with dimethylformamide and this wash combined with the main aqueous mixture. The combined reaction mixture is allowed to set in the ice bath with periodic stirring for about 90 minutes after which it is centrifuged or filtered to obtain 24.7 grams of ethyl 8-hydroxy-1,3-dioxolo[4,5g]quinoline-7-carboxylate. Yield, 94.6 percent.

The advantage of using ammonium hydroxide in this step instead of sodium hydroxide is that a product results which is much more readily filterable. This is a significant advantage on a large scale.

We claim:

1. A process for the production of ethyl 8-hydroxy-1,3-dioxolo[4,5g]quinoline-7-carboxylate which comprises:
   a. reacting ethyl alcohol and phosphorus pentoxide in xylene at a temperature below 120° C.,
   b. adding to the reaction mixture diethyl (3,4-methylenedioxyphenyl)-aminomethylenemalonate,
   c. heating the reaction mixture to a temperature of about 138°–140° C. and held at this temperature for 1 hour,
   d. cooling the reaction mixture,
   e. pouring the cooled reaction mixture into a base,
   f. recovering the resultant precipitate from the reaction mixture.

2. A method according to claim 1 wherein said ethyl alcohol, phosphorus pentoxide and diethyl(3,4-methylenedioxyphenyl)-aminomethylenemalonate are employed approximately at a molar ratio of about 3.53:2.6:1 respectively.

3. A method according to claim 1 wherein said base is a 50 percent sodium hydroxide solution.

4. A method according to claim 1 wherein said base is ammonium hydroxide.

* * * * *